United States Patent [19]

Jameson

[11] 3,918,696

[45] Nov. 11, 1975

[54] COMPOSITE STOCK TUBE

[75] Inventor: Chester E. Jameson, Richmond Heights, Ohio

[73] Assignee: Acme-Cleveland Corporation, Cleveland, Ohio

[22] Filed: Dec. 9, 1974

[21] Appl. No.: 530,738

[52] U.S. Cl. .................. 269/287; 138/113; 193/38; 285/49
[51] Int. Cl.² ...................... B23Q 3/00; F16L 11/00
[58] Field of Search ............. 269/287, 289; 193/38; 138/112, 113, 114; 285/49

[56] References Cited
UNITED STATES PATENTS

| | | | |
|---|---|---|---|
| 1,786,876 | 12/1930 | Tessky | 193/38 |
| 1,891,290 | 12/1932 | Tessky | 193/38 |
| 1,935,999 | 11/1933 | Tessky | 193/38 |
| 2,534,811 | 12/1950 | Corlett | 193/38 |
| 2,700,631 | 1/1955 | Ferguson et al. | 269/287 |
| 2,933,173 | 4/1960 | Lakins | 193/38 |
| 3,420,553 | 1/1969 | Poxon et al. | 285/49 |
| 3,749,132 | 1/1973 | Prezewalski | 138/113 |

Primary Examiner—Al Lawrence Smith
Assistant Examiner—Robert C. Watson
Attorney, Agent, or Firm—Woodling, Krost, Granger & Rust

[57] ABSTRACT

To comply with U.S. Government requirements of a quiet machine tool with a dBA rating less than 90, the noise produced by a hexagonal piece of bar stock rotating inside a stock tube is reduced to well below this level by providing a composite stock tube. An outer cylindrical metal tube houses a plurality of axially aligned tubular elements, the lengths of which are sufficiently short and all physical dimensions and characteristics of which are such as will limit to a frequency range greater than 2,000 Hz. (preferably greater than 16,000 Hz.), the noise vibrations caused by the rotating bar and which vibrations, in the absence of this invention, could be transmitted to the space surrounding the stock tube at a level above 80 dBA. The tubular segments are supported within the outer tube by support means comprising elastic rings which radially separate the tubular segments from the outer tube and preferably axially separate adjacent tubular segments.

16 Claims, 5 Drawing Figures

COMPOSITE STOCK TUBE

BACKGROUND OF THE INVENTION

Machine tools of the bar machine type, either single or multiple spindle machines, usually use bar stock which is quite long, 3 or 4 meters for example, and needs to be supported by a stock tube. Where the machine tool is a multiple spindle automatic, then a stock reel is supplied with a plurality of stock tubes equal in number to the number of spindles in the machine tool. Such stock reel indexes with the indexable turret in the machine tool, and the bar stock rotates within each stock tube whenever the spindle or spindles on the machine tool rotates. The bar stock may be square, round, hexagonal or other cross-sectional shape. Typically, the prior art stock tube has been a simple cylindrical pipe or conduit large enough to accommodate the largest cross-sectional piece of bar stock which may be accommodated in that particular spindle. The greatest amount of noise has been created with bar stock which is other than circular in cross-section, for example, the square and hexagonal cross-sectional shapes. When the spindle rotates and is clamped on the bar stock, the bar stock must necessarily rotate within the stock tube. It necessarily bangs and rattles aroudn inside that stock tube, and, hence, is the source of a considerable amount of noise.

Other prior art constructions have included one wherein a wavy spring is contained within the stock tube and supports the bar stock out of direct contact with the outer tube. This spring is not a true helical spring, but, instead, has alternating sections of larger and smaller diameter with the larger diameter portions engaging the outer tube and the smaller diameter portions engaging the bar stock. Such arrangements were quieter, but had the disadvantages of fairly large vibration of the outer tube, the helical portions of the spring tended to mark the bar stock, and the helical portions of the spring in contact with the bar stock tended to grab the bar stock as it rotated therewithin to attempt to rotate the spring and also to attempt to move it axially within the outer tube.

Another prior art attempt at a composite stock tube was a closely wound helical spring within an outer tubular support with the rotating bar stock within the helical spring, yet such spring lined tube was noisier than the wave spring tupe previously mentioned.

Recent attempts by governmental agencies to reduce noise pollution have let to studies of the noise produced by the machine tools, and it has been found that the stock tubes and stock reels are a major source of such noise pollution. The rattling and clatter of the rotatable bar stock within the stock tube, especially when the bar stock is of a long length and is hexagonal in shape has caused noise in excess of 100 dBA in sound room tests of such machines.

The problem is accordingly how to eliminate such excess noise and get it less than 90 dBA and preferably less than 85 dBA.

This problem is solved according to the present invention by making a composite stock tube in which the rotatable bar stock rotates inside of a bar stock liner which includes a plurality of tubular segments each having small enough physical dimensions to limit the noise vibrations to a frequency range greater than 2,000 Hz. when a bar rotates therewithin. Further, according to the invention, the segments are supported in substantially axial alignment within the outer support and with a majority of the length of each segment spaced from the inside surface of the outer support.

An object of the present invention is to obviate the disadvantages of the prior art.

Another object of the invention is to provide a composite stock tube wherein much of the noise of a rotating piece of bar stock within the stock tube is reduced.

Another object of the invention is to provide a composite stock tube which includes a bar stock liner of short tubular segments, the lengths of which are sufficiently short and all physical dimensions and characteristics of which are such as will limit to a frequency range greater than 2,000 Hz. (preferably greater than 16,000 Hz), the noise vibrations caused by the rotating bar and which vibrations, in the absence of this invention, could be transmitted to the space surrounding the stock tube at a level above 80 dBA.

SUMMARY OF THE INVENTION

The invention may be incorporated in a composite stock tube for supporting bar stock of square, round, hexagonal or other cross-sectional shape to be rotated by and processed in a single or multiple spindle machine tool, said composite stock tube comprising, in combination, an outer support having an inside surface in a generally tubular configuration, a bar stock liner adapted to accommodate the rotatable bar stock and including a plurality of tubular segments each with a generally cylindrical inner surface, means to support said segments in substantially axial alignment within said outer support and with a majority of the length of each segment spaced from said inside surface of said outer support, and means including said individual tubular segments having small enough physical dimensions to limit the noise vibrations to a frequency range greater than 2,000 Hz. upon a bar rotating within said tubular segments.

Other objects and a fuller understanding of the invention may be had by referring to the following description and claims, taken in conjunction with the accompanying drawing.

BRIEF DECRIPTION OF THE DRAWING

DESCRIPTION OF THE PREFERRED EMBODIMENT

Figure 1:
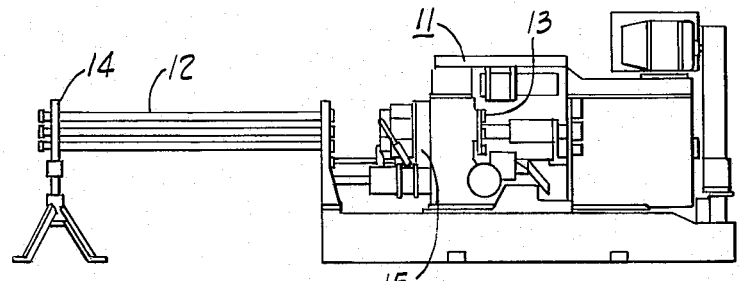
FIG. 1 is a side elevational view of a machine tool and a stock reel which may incorporate the invention.

FIG. 1 illustrates a machine tool 11 which utilizes bars or bar stock and may be a single spindle machine although it is shown as a multiple spindle bar automatic machine tool. The bar stock used in this machine tool 11 is usually long, for example, 3 or 4 meters long, to avoid frequent resupply. Each bar of bar stock is carried in a stock tube 12 so that it can be gripped by and rotated by a spindle 13 in the machine tool 11. Since the machine tool 11 is shown as a multiple spindle machine, the stock tube 12 is one of a plurality of stock tubes in a stock reel 14 which stock reel indexes with an indexable spindle carrier 15 in the machine tool. Accordingly, the composite stock tube 12 of the present invention is used for supporting bar stock such as metal bar stock of square, round, hexagonal or other cross-sectional shape to be rotated by and consumed in a single or multiple spindle automatic bar machine tool.

Figure 2:
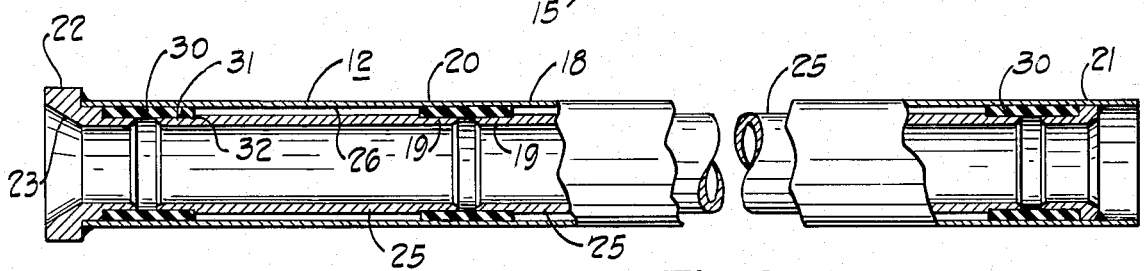
FIG. 2 is an enlarged longitudinal view, mostly in section, of a preferred embodiment of the invention.

FIG. 2 illustrates a preferred embodiment of a composite stock tube 12. This stock tube 12 includes generally an outer support 18, a bar stock liner 19, and support means 20 between the liner 19 and the outer support 18. The composite stock tube 12 has a first end 21 to be attached to the machine tool 11 to supply bar stock thereto. The stock tube 12 also has a second end 22 which often may have an enlarged conical opening 23 to aid in the insertion of bars into the stock tube 12.

The outer support 18 has an inside surface which defines generally a tubular configuration. For simplicity and ease of manufacture, this outer support may be a steel tube, with a solid wall and a circular cross section.

The bar stock liner 19 is adapted to accommodate the rotatable bar stock and in the preferred embodiment accomodates this bar stock directly with the bar stock directly contacting the inner surface of this liner 19. The bar stock liner 19 includes a plurality of tubular segments 25, each with a generally cylindrical inner surface, the better to receive the bar stock regardless of its cross-sectional shape. The support means 20 supports the liner 19 inside the outer support 18, and supports the tubular segments 25 in substantially axial alignment within the outer support 18 with a majority of the length of each segment spaced from the inside surface 26 of the outer support 18. The individual tubular segments 25 are small enough in physical dimension including short enough in physical length to establish the noise of a hexagonal bar rotating therewithin at a frequency which is greater than 2,000 Hz.

Figure 5:
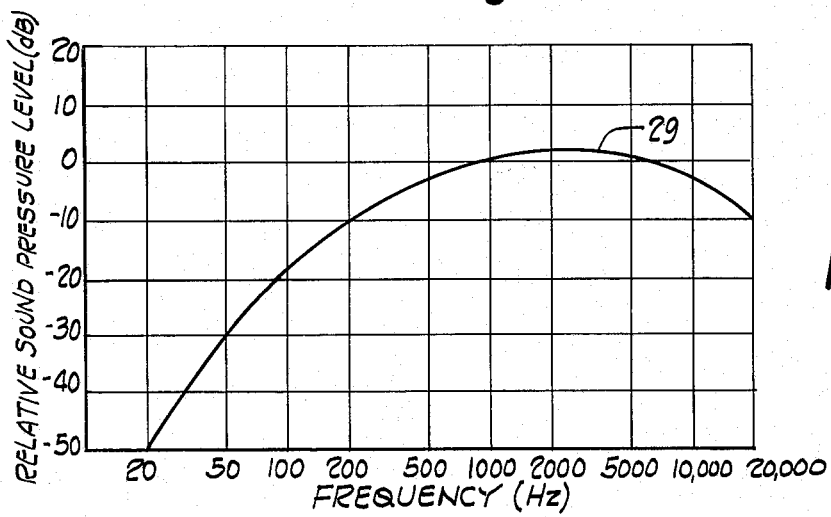
FIG. 5 is a curve showing the dBA response curve which is a weighted curve to account for the frequency response of the ear.

FIG. 5 illustrates a curve 29 which is the A weighted curve of dB or decibels, weighted to account for the frequency response of the human ear. The United States Government has established noise pollution levels under OSHA, which is the Occupational Safety and Health Act. These noise pollution levels require that in manufacturing establishments the sound level will not exceed 90 dBA. This A weighted curve is shown as falling off at the lower and higher frequencies above and below about 2,000 Hz. At the zero dB level, actual sound level is used. At points other than zero dB, the actual reading is reduced by the amount shown on the curve 29 at the particular frequency.

Prior art stock tubes were inherently noisy because the bar stock rotated inside this stationary tube. Round stock is noisy due to bent bars and whipping, and where the bar stock was some cross-sectional shape other than round, this caused considerable clatter and noise. Actual measurements of noise using a microphone and a sound meter confirmed that a single hexagonal bar of 0.75 inch (1.9 cm.) diameter rotating inside a 1.125 inch (2.86 cm.) inside diameter stock tube of the prior art type could produce noise at 100 dBA. This was a single bar and a single tube and of course if four, six, or eight bars were rotating inside tubes in a stock reel for a multiple spindle machine, the noise generated would be even higher. Where two machines are placed side by side the level of noise increases about 3 dB. Accordingly, there is considerable stress to achieve a machine tool, including its stock reel 14, which will have only an 85 dBA level of noise so that the machines may be placed side by side and still not exceed the 90 dBA OSHA requirement.

The present invention achieves a considerable reduction in noise by using the bar stock liner 19 which is segmented. These tubular segments 25 are made physically small, and especially the length is physically short so that the noise generated by the rotating bar stock is at a high frequency. The calculation of the frequency of flexural vibration, which is primarily in bending, is somewhat complex, but the best agreement of the actual test results with the calculated frequency appears to be the frequency calculation for a hollow bar which is fixedly pinned at each end by a transverse pin.

The calculations for flexural vibrations of a uniform beam 3 inches (7.62 cm.) long with a 1.5 inch (3.82 cm.) O.D. and a 1.125 inch (2.86 cm.) I.D. follow.

The natural frequencies of vibration of the beam are $$\omega_n = 2\pi f_n = k_n^2 \, CLr = k_n^2 \sqrt{\frac{EI}{PA}}, \quad (1)$$

Where:
$k_n$ = the wave number, e.g. the fundamental, $CL = \sqrt{E/P}$
  = longitudinal wave velocity,
$r$ = radius of gyration,
$E$ = Young's modulus, = 29.5 × $10^6$ PSI
$P$ = material density, = 0.284 LBS/in$^2$/384 in/sec$^2$
$A$ = cross-section area, = $\pi/4$ ($D^2 - d^2$)
  = 0.7731 in$^2$
$I$ = moment of inertia of A, $\pi/64$ ($D^4 - d^4$)
  = 0.1699, and
$L$ = beam length.

The calculated frequency is $\sin(k_n L) = 0$. The first root of the frequency equation is where $k_1 L = \pi$, or 3.1416, so solving, one obtains:

$$\sin(k_1 L) = 0 = \sin(3 k_1) = \sin 3.1416 \quad (2)$$
$$3 k_1 = 3.1416,$$
$$k_1 = 1.0472. \quad (3)$$

$$\omega_n = 2f_n = k_n^2 \sqrt{\frac{EI}{PA}}$$

$$1/2\pi \sqrt{\frac{EI}{PA}} = 14901/\text{sec}.$$

$$k_1^2 = 1.0966$$
$$f_1 = 14901/\text{sec} \times 1.0966 = 16340 \text{ Hz}. \quad (4)$$

Similar calculations show that for a stock reel tube of 127 inches (3.22 meters) long, the fundamental frequency of vibration is 9.1 Hz. In addition, there are many harmonics being generated. With the bar stock liner 19 cut into segments, when the segments are reduced to 12 inches (30.5 cm.) in length, the fundamental frequency of vibration is 1023 Hz. When the tubular segments are 5 inches (12.7 cm.) long, the fundamental frequency is 5,897 Hz. When the segments are 4 inches (10.16 cm.) long, the fundamental frequency is 9,214 Hz. When the segments are 3 inches long, the fundamental frequency of vibration in bending is 16,340 Hz. This segmentation of the bar stock liner has two advantages. First, it shifts the noise frequency from low frequency to high frequency. Since much of the noise already generated by the machine tool 11 is in the low frequency range, this prevents the noise of the bar stock clattering against the stock tube from reinforcing this noise and thus exceeding the curve 29. Second, if the noise frequency can be made to exceed 2,000 Hz., then, as will be noted from the curve 29 of above, the frequency response of the ear decreases, and thus more actual generation of noise can be tolerated. When 3-inch long segments are used, for example, the frequency generated is in excess of 16,000 Hz., and curve 29 shows that the hearing response of the human ear has already decreased 8 dBA at this point so that the noise generated is more easily tolerated. Where the segments are reduced to 2.715 inches (6.9 cm.) in length then the fundamental frequency of noise vibration is in excess of 20,000, which is outside of the range of human hearing so much more actual noise may be generated without exceeding the OSHA requirements. Still further, any harmonics being generated are well outside the 20,000 Hz. range so these harmonics do not add to the overall noise which is heard by the personnel near such machines.

The present invention contemplates still further improvements in the composite stock tube which is achieved by the support means 20. This support means supports the tubular segments 25 in substantially axial alignment within the outer support 18. Further, a majority of the length of each segment is spaced from the inside surface 26 of such outer support. The support means in the preferred embodiment of FIG. 2 is achieved by elastic or resilient rings 30 which engage reduced diameter end portions 31 on the tubular segments 25. These rings 30 have elasticity in the radial direction and may be made from rubber, for example, or a resilient foam material. By using the elastic rings 30 at the ends of the tubular segments 25, this supports the segments at nodal points of the fundamental frequency of bending vibration of these segments. At these nodal points the actual vibration is at a minimum or null. Preferably, the elastic rings are ones which provide a low transmissibility of vibration so that whatever vibration is present at these nodal points, only a small amount is transmitted to the outer support 18. The reduced diameter end portions 31 provided shoulders 32 at the junction between these reduced diameter portions and the main section of the segments 25. These shoulders 32 establish axial separation between the adjacent tubular segments 25 to further minimize generation and escape of noise from the outer support 18. Also, the air space between the segments 25 and the outer support 18 minimizes the escape of noise from the outer support 18. This noise is not only the bending frequency of the tubular segments 25, but it is also the banging or clattering noise of the bar stock within the tube 12.

Figure 3:
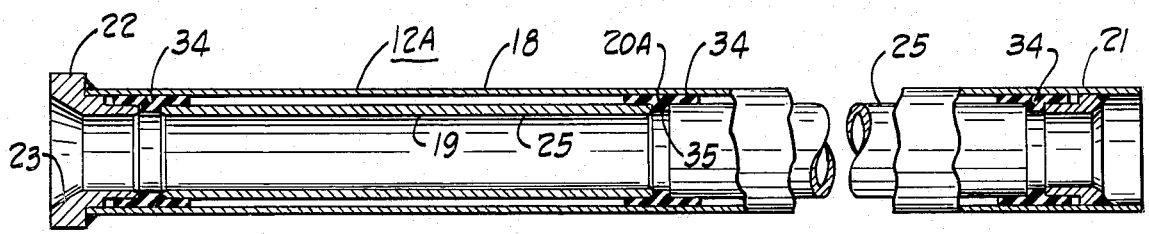
FIG. 3 is an enlarged longitudinal sectional view of a modification of a composite stock tube embodying the invention.

FIG. 3 is a modification of the invention showing a stock tube 12A. Parts that are the same as in FIG. 2 have been shown with the same reference numeral. The tubular segments 25 have been shown as being longer in axial length merely to illustrate that the invention does apply to these longer tubular segments. The support means 20A includes elastic rings 34 which are molded or otherwise provided with a central portion 35 which has a reduced inside diameter and thus spaces axially apart adjacent tubular segments 25 without the necessity for any reduced diameter portions on these segments 25. This reduces the cost of manufacture of such segments yet achieves the same axial separation of the segments and also achieves radial elasticity between the ends of the segments 25 and the outer support 18.

Figure 4:
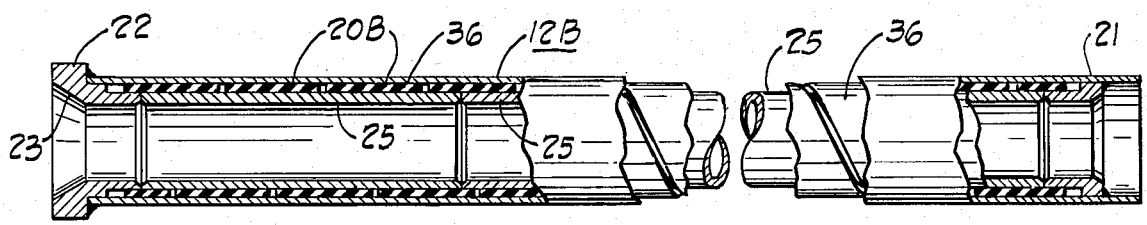
FIG. 4 is an enlarged longitudinal sectional view of a further modification of the invention.

FIG. 4 shown a still further modification of the invention showing a composite stock tube 12B. Again, parts the same as that shown in FIG. 2 are identified by the same reference numerals. The support means 20B is shown as a helically wound band or tape 36 which has elasticity or resilience in the radial direction. The successive turns of the helix may abut each other, or, as shown, may be slightly spaced. This helix of tape may be a solid rubber tape, for example, or, again, may be foam, with the foam type of tape being preferred. Also preferred is that the tape be an adhesive type of tape to adhere to the tubular segments 25. In this embodiment the tubular segments may be slightly axially spaced or, as shown, may abut each other. Where the tape adheres to the tubular segments, this may be used to maintain such tubular segments axially spaced to minimize transfer of vibrations therebetween.

The support means 20B supports the ends of the tubular segments so that a majority of the length of each segment is spaced from the inside surface 26 of the outer support 18. Where the material of the tape 36 is chosen to have a low transmissibility of vibration, then this further diminishes the noise generated and transmitted by the composite stock tube 12. The structure of FIG. 4 has the further advantage that the helix of tape 36 will engage and surround practically all of each tube segment 25, and thus tends to damp these vibrations. This feature is especially valuable at the center of each segment which is an antinode for the fundamental frequency.

The present composite stock tube achieves a considerable reduction in noise from 100 dBA down to only 80 dBA. The calculated noise frequency according to the above formula coincides well with the measured noise frequency and for 3 inch (7.62 cm.) long segments the generated noise frequency has been found to be in excess of 16,000 Hz. At this high frequency only the fundamental frequency is heard, all harmonics being well beyond the audible range. Also, at 16,000 Hz. the curve 29 shows that an additional 8 dBA may be tolerated. With segments only 2.715 inches (6.9 cm.) long, the frequency is too high to be heard by the human ear, hence, considerably more noise may be generated without exceeding OSHA requirements. Additionally, the support means 20, 20A or 20B cushions the shock of the bar stock rotating and tumbling inside of the liner 19 to minimize noise and additionally to minimize the transfer of noise to the outer support 18. This further produces a quiet machine tool 11. The support means further supports the tubular segments generally at the nodal points of the fundamental frequency of vibration in bending and thus the actual transmission of the vibrations to the outer support are minimized. The physical spacing of the vibrating center portion of the tubular segments from the outer support 18 also reduces the effective noise. The tubular segments 25 have a tubular inner surface and for convenience and ease of manufacture may be of metal, smooth walled cylindrical tubing.

The support means 20, 20A or 20B supports the tubular segments in substantially axial alignment to present substantially a smooth continuous solid surface of the liner 19 which does not have a tendency to grab the bar stock, and minimizes any marring of the bar stock.

The present disclosure includes that contained in the appended claims, as well as that of the foregoing description. Although this invention has been described in its preferred form with a certain degree of particularity, it is understood that the present disclosure of the preferred form has been made only be way of example and that numerous changes in the details of construction and the combination and arrangement of parts may be resorted to without departing from the spirit and the scope of the invention as hereinafter claimed.

What is claimed is:

1. A composite stock tube for supporting bar stock of square, round, hexagonal or other cross-sectional shape to be rotated by and processed in a single or multiple spindle machine tool, said composite stock tube comprising, in combination;

an outer support having an inside surface in a generally tubular configuration, a bar stock liner adapted to accommodate the rotatable bar stock and including a plurality of tubular segments each with a generally cylindrical inner surface, means to support said segments in substantially axial alignment within said outer support and with a majority of the length of each segment spaced from said inside surface of said outer support.

and means including said individual tubular segments having small enough physical dimensions to limit the noise vibrations to a frequency range greater than 2,000 Hz. upon a bar rotating within said tubular segments.

2. A composite stock tube as set forth in claim 1, wherein said outer support is a substantially solid walled cylindrical tube.

3. A composite stock tube as set forth in claim 1, wherein each of said tubular segments is a substantially solid walled cylindrical tube.

4. A composite stock tube as set forth in claim 1, wherein said support means supports said tubular segments to present substantially a smooth continuous solid inner surface of said liner.

5. A composite stock tube as set forth in claim 1, wherein said tubular segments are small enough in physical length to limit the noise vibrations to a frequency range in excess of 16,000 Hz. upon a bar rotating therewithin.

6. A composite stock tube as set forth in claim 1, wherein said support means includes means to maintain said tubular segments axially spaced.

7. A composite stock tube as set forth in claim 1, wherein said support means includes a helical wrap of resilient material around said tubular segments.

8. A composite stock tube as set forth in claim 1, wherein said support means supports said tubular segments substantially at the ends thereof.

9. A composite stock tube as set forth in claim 8, including said support means having elasticity in a radial direction.

10. A composite stock tube as set forth in claim 8, wherein said support means includes elastic rings of rubber like material encircling the ends of said tubular segments and engaging said inside surface of said outer support.

11. A composite stock tube as set forth in claim 10, wherein said tubular segments have portions of reduced outside diameter at the ends thereof, and said elastic rings engage said reduced diameter portions.

12. A composite stock tube as set forth in claim 10, wherein said elastic rings have a reduced inside diameter portion near the longitudinal center thereof to axially separate two adjacent tubular segments.

13. A composite stock tube as set forth in claim 1, wherein said support means supports said tubular segments substantially at nodal points of vibration in bending.

14. A composite stock tube as set forth in claim 13, wherein said support means includes means of low transmissibility of vibrations relative to the material of said tubular segments.

15. A composite stock tube as set forth in claim 1, wherein said support means includes means to support said tubular segments substantially at the antinodal points of vibration in bending.

16. A composite stock tube as set forth in claim 15, wherein said support means at said antinodal points includes means to damp the vibrations.

* * * * *